United States Patent [19]

Shepherd

[11] Patent Number: 4,836,058
[45] Date of Patent: Jun. 6, 1989

[54] SAW CHAIN GRINDING MACHINE

[76] Inventor: James E. Shepherd, 1231 Dutton Rd., Eagle Point, Oreg. 97524

[21] Appl. No.: 129,535

[22] Filed: Dec. 7, 1987

[51] Int. Cl.⁴ .............................................. B23D 63/16
[52] U.S. Cl. ....................................... 76/25 A; 76/40; 76/43
[58] Field of Search ............... 76/37, 40, 41, 42, 43, 76/25 A

[56] References Cited

U.S. PATENT DOCUMENTS

| | | | |
|---|---|---|---|
| 2,589,165 | 3/1952 | Toy et al. | 76/40 |
| 2,704,948 | 3/1955 | Le Grand | 76/41 |
| 2,811,873 | 11/1957 | Nielsen | 76/40 |
| 2,811,874 | 11/1957 | Rethoret | 76/40 |
| 2,824,468 | 2/1958 | Nielsen | 76/40 |
| 2,986,048 | 5/1961 | Nielsen | 76/37 |
| 3,006,222 | 10/1961 | McEwan | 76/37 |
| 3,071,026 | 1/1963 | De Witt | 76/40 |
| 3,349,645 | 10/1967 | Silvey | 76/40 |
| 3,695,123 | 10/1972 | Silvey | 76/43 |
| 3,779,103 | 12/1973 | Silvey | 76/40 |
| 3,877,324 | 4/1975 | Silvey | 76/40 |
| 4,235,131 | 11/1980 | Simington | 76/42 |
| 4,287,793 | 9/1981 | Silvey | 76/25 |
| 4,522,087 | 6/1985 | Silvey | 76/25 |
| 4,539,871 | 10/1985 | Simington | 76/42 |

*Primary Examiner*—Roscoe V. Parker
*Attorney, Agent, or Firm*—Eugene M. Eckelman

[57] ABSTRACT

A disc-shaped rotatable grinding wheel has association with a saw chain holder such that in the support of a chain thereon oppositely facing cutter elements can be ground at the same point on the grinding wheel. The saw chain holder has a pivotal mounting for positioning the saw chain at the same point on the wheel for the oppositely facing cutter elements. Various adjustments are included in the structure for positioning the chain in place and for limiting the position of grinding structure.

6 Claims, 5 Drawing Sheets

SAW CHAIN GRINDING MACHINE

BACKGROUND OF THE INVENTION

This invention relates to new and useful improvements in saw chain grinding machines.

Saw chains now in use have right and left cutter elements on alternate cutter links. Two common types of chain have hook-shaped cutter elements. One such common type, called the "chipper" or "round tooth" chain, has generally curved hook-shaped cutter teeth. The other common type, called the "chisel bit" chain, has generally L-shaped cutter elements with the side and top portions of each cutter element meeting at a sharp corner formed by precisely meeting angles. The oppositely directed cutter elements of such chains require grinding from opposite directions, and for the purpose of sharpening the cutter elements to provide a smooth and fast cut in the wood, the right and left cutter elements must all be ground uniformly.

In an attempt to achieve the best possible grinding of cutter elements, prior devices have been employed that seek uniform engagement of the opposite cutter elements with the grinding wheel. Also, to provide the desired angular engagement between the grinding wheel and the cutter elements, prior devices have used relative angles between the axis of the chain support on the machine base and the axis of the grinding wheel. A representative structure utilizing the relative angle arrangement between the axis of the chain support and the axis of the grinding wheel and for attempted uniform grinding is shown in U.S. Pat. No. 3,695,123. For the purpose of sharpening opposite cutter elements in this type of structure, the chain must be supported on separate holders disposed on opposite sides of the grinding wheel. Devices have also been employed which swing from one side of the grinding wheel to the other for engaging the oppositely directed cutter elements. Representative patents utilizing this latter type of structure comprise U.S. Pat. Nos. 4,287,793 and 4,539,871.

The structures as above defined which require that the saw chain be transferred from one side of the wheel to the other on different holders or which utilize a holder that is swung from one side of the grinder to the other all require a rather complex mechanism. Such complex mechanism makes it difficult if not impossible to precisely position mechanically opposite cutter elements for uniform grinding, particularly after wear of sharpening machine parts occurs. That is, such mechanisms require pivots or linkages or spaced mounting means which due to play or tolerances make it impossible to provide uniform grinding of all the opposite cutter elements.

SUMMARY OF THE INVENTION

According to the present invention and forming a primary objective thereof, a saw chain grinding machine is provided that uses a novel relationship between the saw chain holder and the grinding wheel whereby precise and uniform symmetrical sharpening is provided for oppositely facing cutter elements.

Another object of the invention is to provide pivotal support of the chain holder such that a cutter element being sharpened is held on the pivotal axis of the holder, namely, the pivotal axis of the chain holder passes through the area of grinding engagement and all the cutter elements use the same radial grinding point on the edge of the grinding wheel upon relative movement of the grinding wheel and chain holder.

Still another object of the invention is to provide a grinding machine of the type described employing support means for a chain holder which is parallel with the plane of the grinding wheel, such structural arrangement facilitating the said sharpening of oppositely facing cutter elements at the same radial point of grinding on the edge of the grinding wheel. Right and left cutter elements are ground simply by pivoting the holder between identical opposite angular positions, thus eliminating the necessity of transferring the chain from one side to the other or of utilizing swing arms and also assuring the symmetrical sharpening of the opposite cutter elements.

The present grinding machine is designed for sharpening square ground chisel bit chains. As is well known, a chisel bit chain has generally L-shaped cutter elements with the side and top surfaces of each cutter element meeting at a sharp corner and with portions of the elements to be ground being beveled. It employs a disc-shaped, rotatable grinding wheel having a peripheral grinding edge of the proper shape. A saw chain bar or holder for supporting the chain to be sharpened is provided and this bar and the grinding wheel have relative movement for accomplishing a grinding function between the grinding edge of the wheel and the areas of cutting elements to be ground. The support means for the chain bar is parallel with the plane of the grinding wheel and comprises a pivot having an axis which passes through the grinding area and which centers the cutter elements on this axis, thus accomplishing the novel function of grinding opposite cutter elements at the same point on the wheel. The support means is capable of pivoting the chain bar to a pair of identically opposite angular positions for grinding right and left cutter elements at the same point on the edge of the grinding wheel and at the proper angle.

The invention will be better understood and additional objects and advantages will become apparent from the following description taken in connection with the accompanying drawings.

DETAILED DESCRIPTION OF PREFERRED EMBODIMENTS

Figure 1:
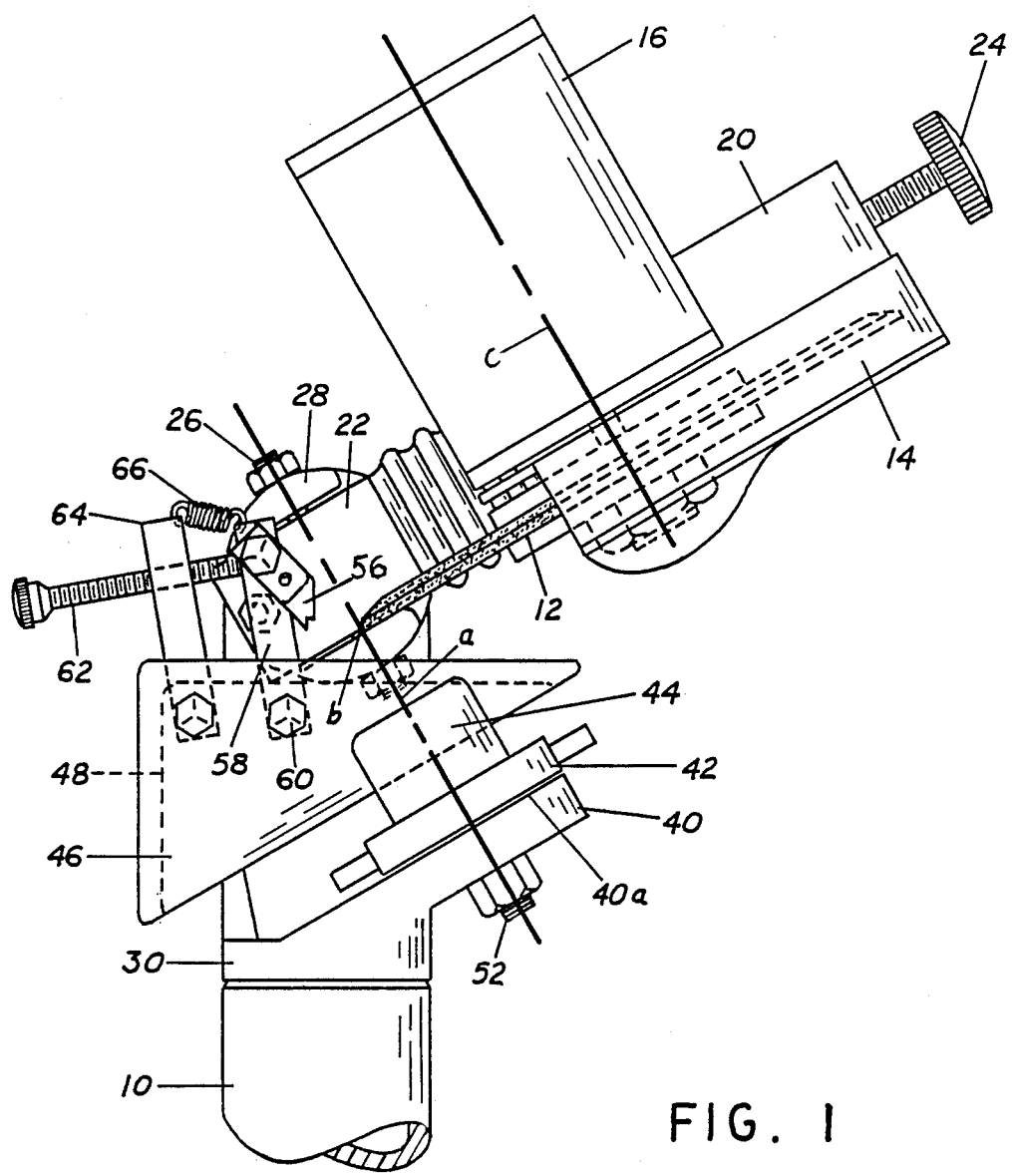
FIG. 1 is a side elevational view of a first form of saw chain grinding machine embodying features of the present invention.
Figure 2:
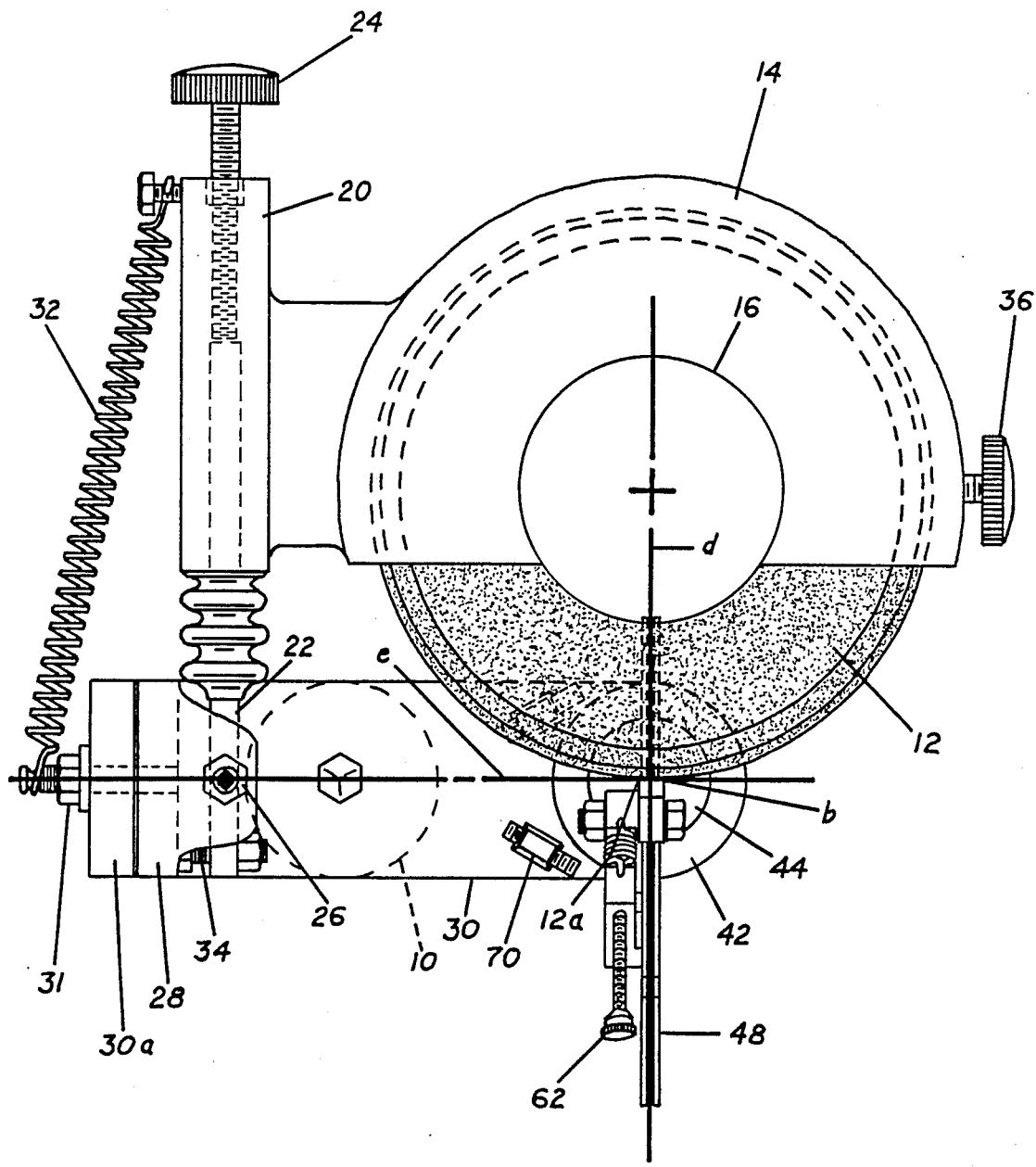
FIG. 2 is a top plan view of the machine.
Figure 3:
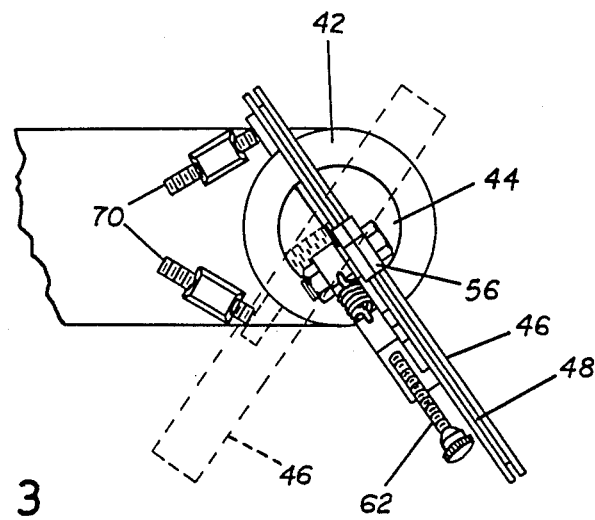
FIG. 3 is a fragmentary detail view of chain bar holding means, one of two positions of the chain bar holding means being shown in phantom lines.

With reference first to FIGS. 1, 2 and 3, a first embodiment of saw chain grinding machine is illustrated. Such embodiment employs a machine base including a pedestal 10 supporting the grinding machine for convenient operation by an operator in standing or sitting position. The machine base supports a grinding wheel 12 shielded by a guard 14. The grinding wheel is driven by a motor 16, and this grinding assembly is secured and supported by slide means 20. Slide means 20 is supported non-rotatably on an elongated body member 22 and is adjustable longitudinally of such body member by an adjusting screw 24 threadedly mounted in the end of the slide means and abutting the end of the body member 22. Screw 24 adjustably moves the motor assembly and grinding wheel to selected positions as the latter wears, as will be more apparent hereinafter. Body member 22 is supported on an upright pivot 26 on an upright extension 28 forming a part of a lateral bed plate 30 in turn integral with the pedestal 10. Support of extension 28 on bed plate 30 is by means of a locking pivot assembly 31 secured between the extension 28 and an upright flange 30a forming an integral part of the bed plate 30. Pivot assembly 31 extends parallel with bed plate 30. The motor and grinding wheel assembly is held retracted on its pivot 26, namely, in a counterclockwise direction as viewed in FIG. 2, by a tension spring 32 connected between the slide means 20 and the bed plate. This spring also holds the screw 24 in abutment with the end of body member 22. A factory stop screw 34 is mounted adjustably in the body member 22 and is arranged for abutment with the upright extension 28. This screw locates the leading edge of the grinding wheel selectively at the completion of a grinding step, as will be explained in greater detail hereinafter. The grinding wheel assembly has a handle 36 for manual pivotal operation toward and into a grinding position.

Bed plate 30 has a rearward extension 40 forming a base for a turntable 42 having an upper extension 44. The extension 44 fixedly supports an upstanding plate-like bar or holder 46 which, similar to a chain saw bar, has an edge slot 48 in which a saw chain to be sharpened is laid with the driving tines downwardly and the cutter elements projecting upwardly from the bar. The turntable 42 and its integral extension 44 have a pivot connection 52 on the rear projection 40, and in a specific construction of the instant invention, for reasons to be explained hereinafter, the supporting surface 40a for the turntable is precisely parallel with the flat or surface plane of the grinding wheel 12. With reference to FIG. 1, pivot axis a of the chain support 42, 44 passes through the grinding area which is designated by b. Since the support for the chain bar holder and grinding wheel are parallel, the axis a of the support is parallel with grinding wheel axis c. The slope of the top edge of bar slot 48 relative to supporting surface 40a is preselected and comprises the angle which when the bar is turned on its pivot to a grinding position is the proper angle of engagement by the grinder with the cutter element. The top edge of bar 48 generally extends about 30 degrees relative to surface 40a to accomplish the desired grinding angle.

The grinder employs a stop pawl 56 arranged to engage the rear edge of a cutter element and hold the cutter element stationary in grinding area b as the grinding wheel moves into the cutter element during a grinding operation. Stop pawl 56 is pivotally supported on an upright link 58 having a pivot support 60 at its lower end on the bar 46 and being freely abutted at its upper end by the end of an adjusting screw 62 threadedly supported in an upright post 64 secured in a stationary position to the bar 46. Link 58 is maintained in engagement with the end of adjusting screw 62 by a tension spring 66 connected between this link and post 64. In operation, stop pawl 56 will abut against the rear of a cutter element and hold it in position for grinding, and since such pawl is pivotally supported and free to move in a counterclockwise direction as viewed in FIG. 1, the chain can be advanced forward under it as the cutter elements are sharpened but will catch each cutter element as the chain is moved back into position for grinding.

According to the present invention, the particular relationship of the parts provides for precise, efficient, and symmetrical sharpening of right and left cutter elements. More particularly, the parts are dimensioned and arranged such that the grinding wheel is supported, by means of the support at pivot 26, so that its forwardmost or grinding point 12a is precisely centered laterally on an imaginary radial line d which intersects axis a of support pivot 52 and the axis c of the wheel and that such grinding point will stay on line d when it is adjusted inwardly by screw 24 for wheel wear. For this purpose, body member 22 must guide slide means 20 in a line parallel with line d, or in other words, in a line perpendicular to an imaginary line e passing through pivot 26 and the grinding point 12a and axis a. This is accomplished by precise adjustment of stop screw 34 at the factory. The grinding wheel assembly also is preset at the factory by locking pivot 31 such that the wheel is parallel with supporting surface 40a.

Operation

In describing the operation of the present chain grinder, it is assumed that stop screw 34 has been properly positioned at the factory to stop the wheel at the completion of a grinding step precisely with its leading or grinding edge on line d and that the wheel is made parallel to surface 40a by proper factory setting of pivot support 31.

When sharpening a chain, the operator places the chain in the slot 48 of the bar 46 with the cutter element to be sharpened backed up against the stop pawl 56. The operator then determines by the length of the cutter element its position for grinding and adjusts screw 62 such that when the cutter elements are fully ground, they are provided precisely with the chisel bit type sharp corner between side and top ground portions. Before grinding, stop screws 70 must be adjusted to control the lateral angle at which the wheel engages the cutter elements, as will be more apparent hereinafter. Furthermore, if there has been wheel wear, the operator moves the wheel forward by adjustment of screw 24 such that the grinding point 12a thereof at the completion of a grinding step is on the axis a of the pivot 52.

Right and left cutter elements are ground by angling the bar first in one direction, such as shown in full lines in FIG. 3, and sharpening all of the cutter elements which face in one direction by pivoting the grinding wheel assembly forwardly to its stop position provided by stop screw 34, and then angling the bar 46 in the opposite direction, as shown in broken lines in FIG. 3, and sharpening the oppositely facing cutter elements. Precise lateral stop positions of the bar in the two locations are accomplished by the adjustable set screw stops 70 on the bed plate. By the arrangement of sharpening just described, all the cutter elements are ground at the same radial point 12a on the grinding edge of the wheel.

Since the chain is supported on a base 40a which is parallel with the grinding wheel and its cutter elements centered for grinding on an axis a which is in the area of grinding engagement of the wheel, precise and symmetrical sharpening of both right and left-hand cutter elements is accomplished. Such makes for the best possible cutting chain. Since the grinding is accomplished at one point for both right and left cutter elements, structure for relocating the chain on a holder or for moving it from one side of the wheel to the other is not necessary and thus elements which can cause inaccuracy and inconvenience are not present. As the wheel wears, it is adjusted forwardly by means of adjusting screw 24, such adjustment being made to keep the leading edge of the wheel at the completion of a grinding step precisely on the axis a.

Figure 4:
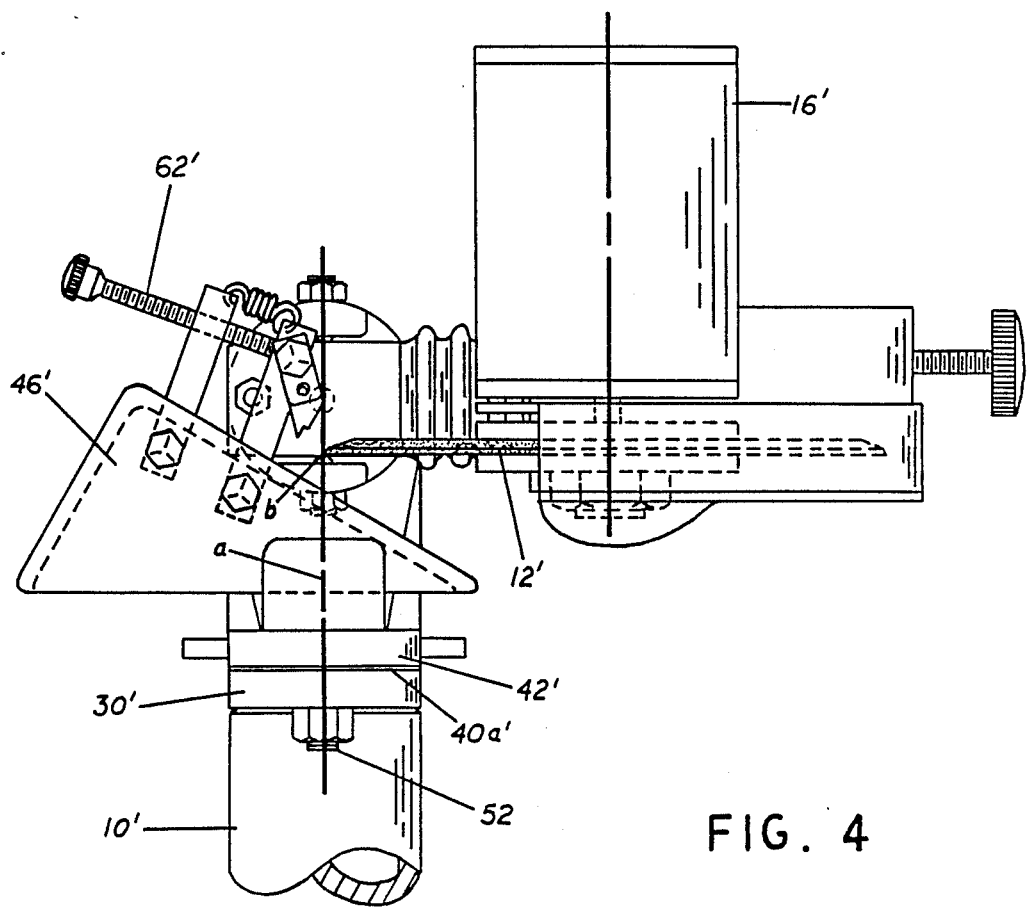
FIG. 4 is an elevational view of an embodiment having the same structure as FIG. 1 but with the grinding wheel and chain bar holding means supported in a different plane.

In the embodiment of FIG. 4, identical elements of the structure of FIG. 1 are present. In this embodiment, however, bed plate 30' on a pedestal 10' supports the turntable 42' for the bar 46' in a horizontal plane. The grinding wheel 12' and its motor assembly 16' are secured in place such that the grinding wheel 12' is parallel with chain support surface 40a'. Such an arrangement is identical in concept as that of FIG. 1, namely, the support surface for the chain bar is parallel with the surface of the grinding wheel and the axis a of the chain support passes through the area of grinding engagement of the grinding wheel. The grinding operations of FIGS. 1 and 4 are identical, the difference in the support position of the chain being merely for operator convenience.

Figure 5:
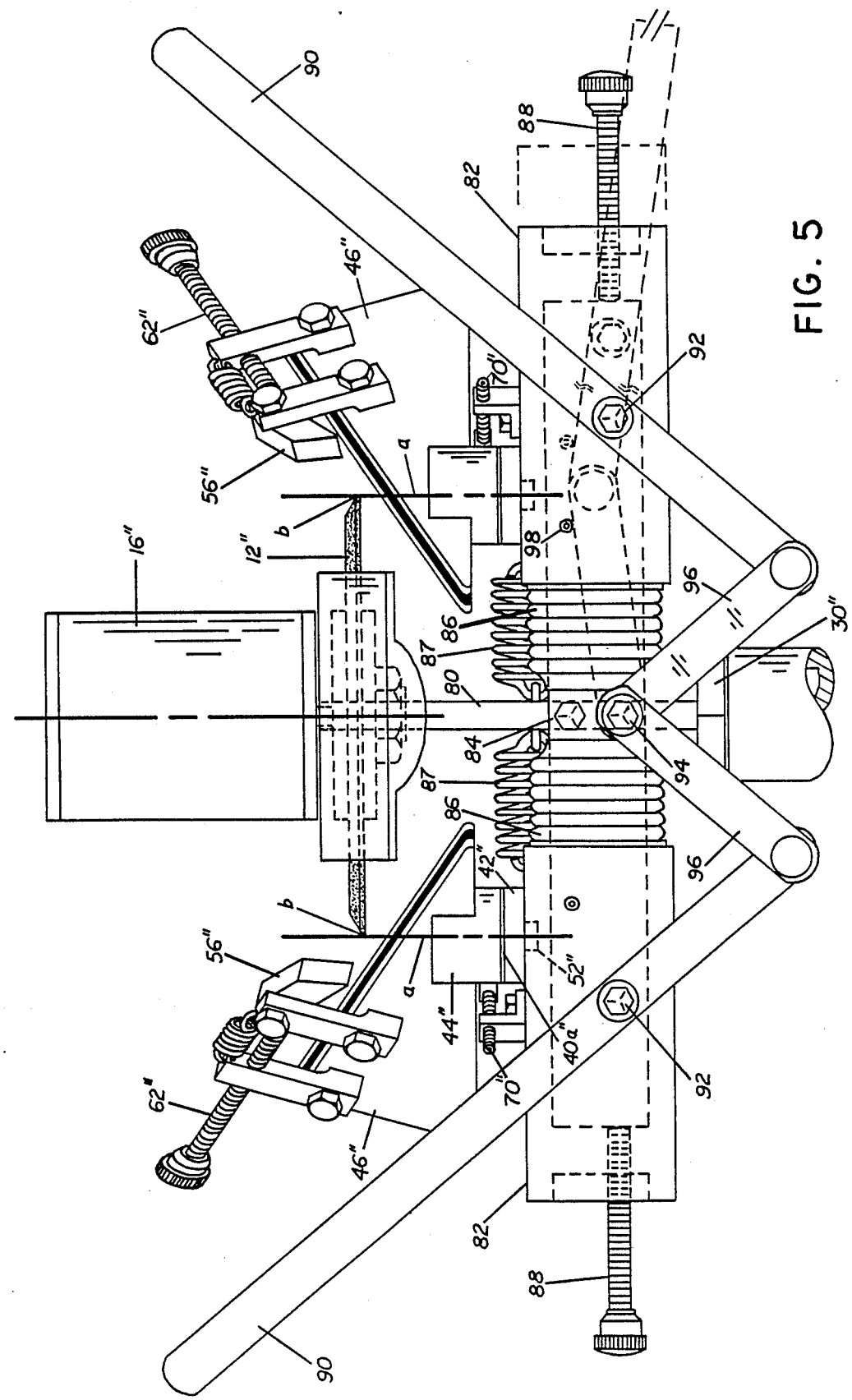
FIG. 5 is an elevational view of another embodiment of the invention.
Figure 6:
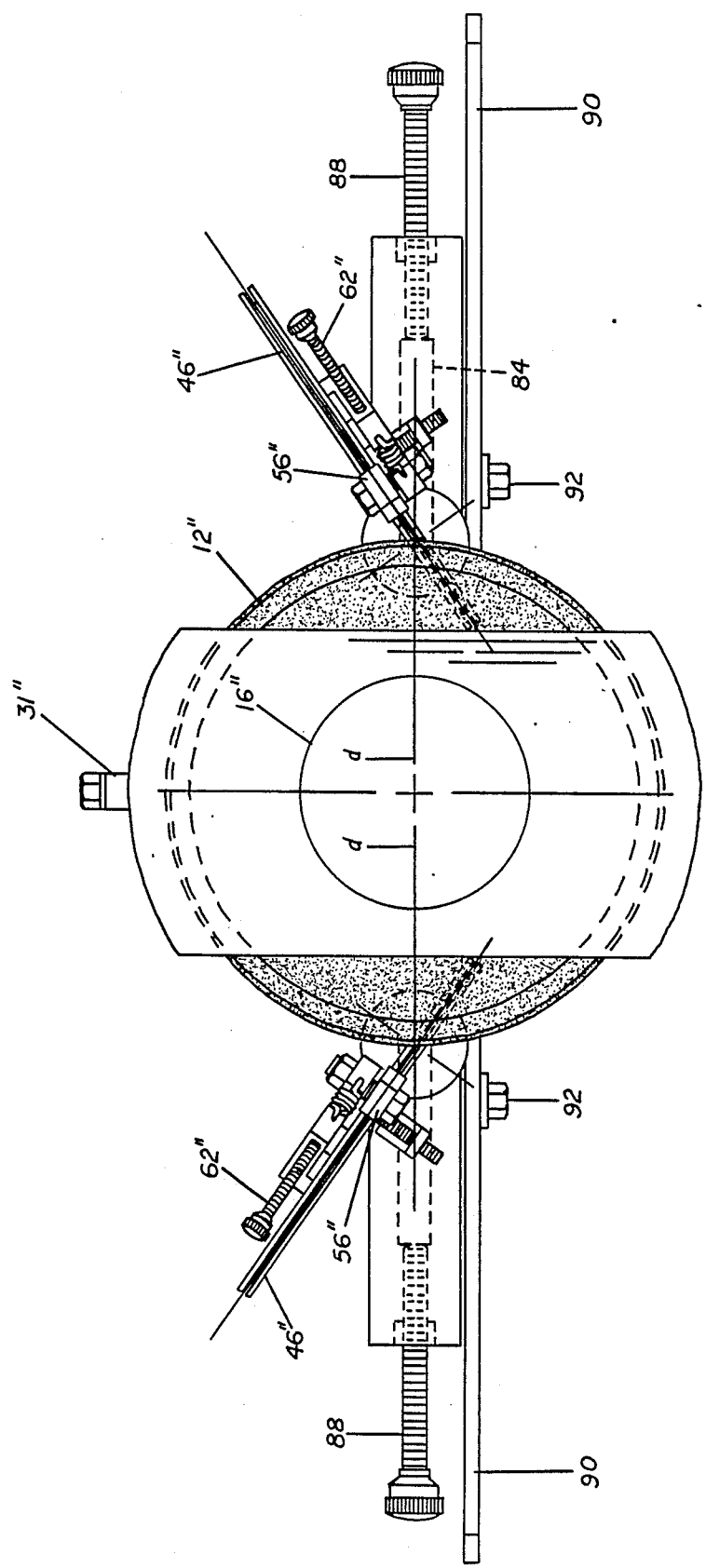
FIG. 6 is a top plan view of the FIG. 5 embodiment.

FIGS. 5 and 6 illustrate a further embodiment of the invention and show a reverse concept of the invention wherein the motor assembly is stationary and the saw chain is slidably moved relative to the grinding wheel during the grinding step. In this embodiment, a motor assembly 16" with its grinding wheel 12" is mounted in a stationary position on a machine base 30" by means of an upright support 80. The grinding wheel 12" is associated with one or more saw chain bars 46" having the same chain holding structure as in FIG. 1, including stop pawl 56" and adjustment screw 62". Also similar to FIG. 1, the chain bars 46" are secured fixedly in upper extensions 44" of turntables 42" which have supporting surfaces 40a" parallel with the grinding wheel 12", and furthermore, the axis a of pivot 52" for the chain support passes through the area b of grinding engagement.

In the embodiment of FIGS. 5 and 6, the turntables 42" are integrally supported on slide members 82 slidably supported on a laterally disposed body member 84 integral with the machine base. Boot members 86 cover the body member 84 at the inner portion thereof and the slide members 82 are urged inwardly by tension springs 87 connected between such slide members and the stationary upright support 80. Adjusting screws 88 are threadedly mounted in the end of slide members 82 and abut against the adjacent end of the body member 84 to limit grinding penetration of the wheel, these screws normally being held in such abutting relation by the springs 87. These screws provide adjustment of the slide members for wheel wear.

In a grinding operation, controlled grinding movement of the bars 46" is accomplished by hand levers 90 pivotally connected intermediate their ends at 92 to the respective slide members 82 and supported on the machine base by a common pivot 94. Links 96 at one end of the levers pivotally connect the latter to the pivot 94. Levers 90 have an overcenter lowered stationary position, as shown in broken lines in FIG. 5, that allows the operator to mount the chain on a bar 46" or to adjust the chain forwardly to the next cutter element. In retracting the levers 90, slide members 82 move outwardly and the screws 88 move out of abutting relation with the body member 84.

Pivotal movement of the levers 90 in an upward direction is controlled by the operator to move chain bars 46" toward the grinding wheel 12" for accomplishing the grinding step. Inward grinding movement of the cutter elements is limited by abutment of adjusting screws 88 with the ends of the body member 84, these settings being made at the start of the grinding operation and dependent upon wheel wear so that the chisel bit cutter elements are properly ground with their sharp corner between side and top ground portions. Screws 62" are also adjusted to properly position the cutter elements as controlled by the length thereof. Return of the chain bar assemblies for moving the next tooth into grinding position is by manual downward movement of the levers 90 to their over-center position. The over-center movement of the levers is limited by stops 98.

The oppositely located chain supports of FIGS. 5 and 6 do not have functional cooperation with each other but illustrate that either side of the wheel can be used to sharpen both right and left cutter elements. In this embodiment, the cutter element is moved into the grinding wheel instead of moving the grinding wheel into the cutter element as in FIG. 1. The same novel function of sharpening both right and left cutter elements of a chain at one point on the wheel is present, the sharpening point of the wheel always being centered on an imaginary line d extending between axis a and the axis of the wheel. In this embodiment, a chain to be sharpened is draped over a chain bar 46" with suitable adjustments first being made with adjusting screw 88 for stopping the cutter elements properly when it has been fully ground, namely, precisely in line with axis a. The cutter elements facing in one direction are sharpened with a bar 46" being angled in one direction and then oppositely facing cutter elements sharpened on this same bar with the latter angled in an identically opposite direction. Suitable adjustable stop means 70" for precisely locating the bars 46" in these angular positions project from the slide members 82 for engagement by the bars 46". Since grinding of the right and left cutter elements of the chain is accomplished at the same point on the grinding wheel, namely, a central leading edge, and the grinding edge is on the axis of pivot, the same advantages of preciseness and simplicity are present as was pointed out with other embodiments.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A grinding machine for a chisel bit type saw chain having alternate right and left cutter elements with side and top surfaces meeting at a sharp corner and with portions thereof to be ground being beveled, said grinding machine comprising;
   a machine base,
   a disc-shaped rotatable grinding wheel having a peripheral grinding edge,
   said base including means mounting said grinding wheel for rotation about a central axis perpendicular to the plane of said wheel,
   saw chain holder means for holding a saw chain with the cutter elements adjacent the grinding edge of said wheel,
   and pivot support means for supporting said saw chain holder means, said pivot support means having a pivot axis parallel with the axis of said grinding wheel, said saw chain holder means being pivotal between a pair of identically opposite angular positions and grinding right and left cutter elements at the same radial point on the edge of said grinding wheel upon relative movement of said grinding wheel and said saw chain holder means.

2. The grinding machine of claim 1 wherein said saw chain holder means includes a bar providing edge support for the chain, said bar having one edge thereof which supports a saw chain for selected angular engagement by said grinding wheel into cutter elements for grinding said beveled portions in said pair of angular positions.

3. The grinding machine of claim 1 wherein said means mounting said grinding wheel is adjustable in a direction parallel with said grinding wheel to move said grinding wheel into grinding position as it wears smaller.

4. The grinding machine of claim 1 wherein said pivot support means for said chain includes a bar providing edge support for the chain, sad bar having one angled edge thereof which supports a saw chain for selected angular engagement by said grinding wheel into cutter elements, said angled edge of said bar in its opposite angular positions turning said cutter elements such that said grinding wheel engages the cutter elements in angular planes.

5. The grinding machine of claim 4 wherein said one edge of said bar extends at approximately 30 degrees relative to support means.

6. A grinding machine for a chisel bit type having alternate right and left cutter elements with side and top surfaces meeting at a sharp corner and with portions thereof to be ground being beveled, said grinding machine comprising:

a machine base, a peripheral a disc-shaped rotatable grinding wheel having grinding edge, grinding wheel said base including means mounting said for rotation about a central axis perpendicular to the plane of said wheel, saw chain holder means for holding a saw chain and pivot support means for said saw chain holder means, said saw chain holder mean being supported on said pivot support means in a non-pivotal securement and holding a saw chain such that said grinding edge is located on an extension of the axis of rotation of said saw chain holder means, said pivot support means having a pivot axis parallel with the axis of said grinding wheel, said saw chain holder means being pivotal between a pair of identically opposite angular positions for grinding right and left cutter elements at the same radial point on the edge of said grinding wheel upon relative movement of said grinding wheel and said saw chain holder means.

* * * * *

UNITED STATES PATENT AND TRADEMARK OFFICE
CERTIFICATE OF CORRECTION

PATENT NO.    : 4,836,058
DATED         : June 6, 1989
INVENTOR(S)   : JAMES E. SHEPHERD It is certified that error appears in the above-identified patent and that said Letters Patent is hereby corrected as shown below:

Column 8, line 9, delete "a peripheral";

line 10, after "having" insert:--a peripheral --;

line 11, delete "grinding wheel";

line 12, before "for" insert: --grinding wheel--.

Signed and Sealed this

Twentieth Day of February, 1990

*Attest:*

JEFFREY M. SAMUELS

*Attesting Officer*       *Acting Commissioner of Patents and Trademarks*